United States Patent [19]

Bornemisza

[11] Patent Number: 5,105,616
[45] Date of Patent: Apr. 21, 1992

[54] GAS TURBINE WITH SPLIT FLOW RADIAL COMPRESSOR

[75] Inventor: Tibor G. Bornemisza, San Diego, Calif.

[73] Assignee: Sundstrand Corporation, Rockford, Ill.

[21] Appl. No.: 447,443

[22] Filed: Dec. 7, 1989

[51] Int. Cl.$^5$ ............................................. F02C 3/05
[52] U.S. Cl. ................................... 60/39.36; 60/726
[58] Field of Search ............... 60/726, 727, 39.36; 415/199.1, 206, 203, 182.1

[56] References Cited

U.S. PATENT DOCUMENTS

| | | | |
|---|---|---|---|
| 2,611,241 | 9/1952 | Schulz | 60/726 |
| 2,827,261 | 3/1958 | Parker et al. | 415/206 |
| 2,936,745 | 5/1960 | Frank | 415/182.1 |
| 3,143,103 | 8/1964 | Zuhn | 415/143 |
| 3,269,119 | 8/1966 | Price | 60/726 |
| 3,781,126 | 12/1973 | Benisek | 415/182.1 |
| 3,829,235 | 8/1974 | Wollenweber, Jr. | 415/143 |
| 3,937,013 | 2/1976 | Aspinwall | 415/145 |
| 3,953,147 | 4/1976 | Aspinwall | 415/143 |

*Primary Examiner*—Louis J. Casaregola
*Assistant Examiner*—Timothy S. Thorpe
*Attorney, Agent, or Firm*—Wood, Phillips, Mason, Rectenwald & VanSanten

[57] ABSTRACT

Undesirably low efficiencies in a gas turbine engine of the sort having a radial compressor may be increased by forming the compressor with radially inner, high pressure ratio blades (16) and radially outer, low pressure ratio blades (18). The low pressure ratio blades (18) may discharge to a receiver (38, 40) for relatively low pressure air which in turn may be utilized as bleed air (FIG. 3) or as thrust (FIG. 2) as desired or even multi-staged with the high pressure blades (FIG. 4). The high pressure ratio blades (16) discharge to a receiver (48) which is in fluid communication with a plenum (54) to provide combustion air to a combustor (56) which in turn produces gases of combustion to drive a turbine wheel (66). By utilizing high pressure air from the high pressure ratio blades (16) for this purpose, engine efficiency is maximized.

1 Claim, 1 Drawing Sheet

GAS TURBINE WITH SPLIT FLOW RADIAL COMPRESSOR

FIELD OF THE INVENTION

This invention relates to gas turbines, and more particularly, to a gas turbine having a radial compressor.

BACKGROUND OF THE INVENTION

Small gas tubines frequently employ radial flow compressors. Such compressors lend themselves to axial compactness. However, when multiple stage compression is required to maximize efficiency, the advantage of axial compactness is at least partially offset.

Conversely, when only a typical single stage radial compressor is used, efficiency may be lost because compressed air at relatively high pressure desired for maximum efficiency in combustion and turbine operation may be utilized in part for other purposes as, for example, providing bleed air, or bypass air in a thrust engine.

The present invention is directed to overcoming the foregoing and other problems in a gas turbine having a radial compressor.

SUMMARY OF THE INVENTION

It is the principal object of the invention to provide a new and improved gas turbine engine of the type having a radial compressor. More specifically, it is an object of the invention to provide such a gas turbine wherein efficiency may be maximized along with the ability to retain the advantage of axial compactness.

An exemplary embodiment of the invention achieves the foregoing object in a gas turbine construction including a turbine wheel mounted for rotation about an axis. A nozzle is disposed about the turbine wheel for directing gas thereat. A combustor is provided for burning fuel with compressed air and providing the products of combustion to the nozzle. A compressed air plenum is disposed about the combustor and a radial flow centrifugal compressor is rotatable about an axis and is coupled to the turbine wheel to be driven thereby. The compressor has aerodynamically separate blade sets including a set of radially inner, high pressure ratio blades and a set of radially outer, low pressure ratio blades A first receiver is a line with the high pressure ratio blades and is connected to the plenum to provide high pressure air to the combustor for high efficiency combustion. A second receiver is aligned with the low pressure ratio blades and is adapted to be connected to a point of use for air compressed by the low pressure ratio blades.

In one embodiment of the invention, the point of use may be a typical use of bleed air.

According to another embodiment of the invention, the point of use may be a thrust nozzle as when the engine is a thrust engine. The air from the low pressure ratio blades thus serves as bypass air that is utilized to generate thrust.

In still another embodiment of the invention, the point of use may be the inlet side of the high pressure blades. Consequently, a multi-stage type of compressor is defined using a single compressor rotor so that axial compactness is retained.

In one embodiment of the invention there is a common inlet for both the high and low pressure ratio blades. According to one aspect of the invention, the common inlet includes variable inlet guide vanes for selectively occluding one of the sets of blades. In a highly preferred embodiment, the low pressure ratio blade sets are occluded by the vanes so that the machine may be unloaded during starting or the like.

Other objects and advantages will become apparent from the following specification taken in connection with the accompanying drawings.

DESCRIPTION OF THE PREFERRED EMBODIMENTS

Figure 1:
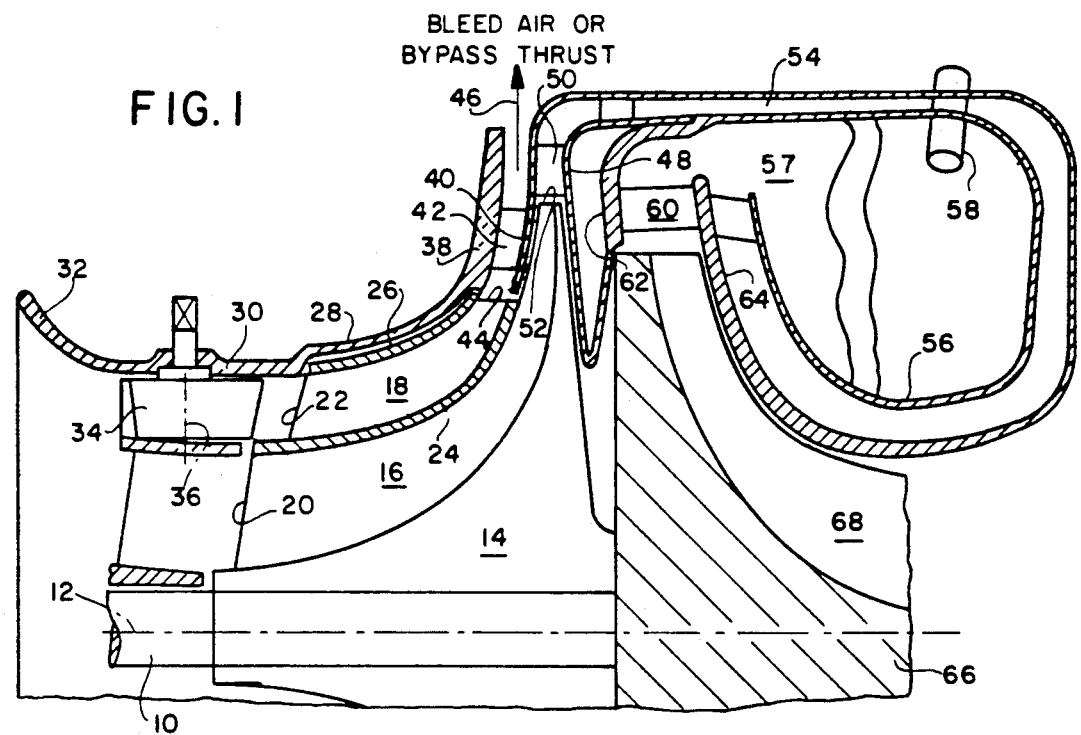
FIG. 1 is a sectional view of a gas turbine engine made according to the invention.

An exemplary embodiment of a gas turbine made according to the invention is illustrated in FIG. 1 and is seen to include a rotary shaft 10 mounted for rotation about an axis 12 by bearings not shown. On one end of the shaft 10 is a rotor hub 14 which is carried by the shaft 10 for rotation therewith. The rotor hub 14 is the hub of a radial compressor and to this end, the hub 14 is provided with two sets of compressor blades 16 and 18, both of which discharge in the radial direction as is well known. The blades 16 are high pressure ratio blades and have their inlet ends 20 radially inward of the blades 18. The blades 18 define a set of low pressure ratio blades and have their inlet ends 22 radially outward of the blades 16.

The blades 16 and 18 are maintained separate by a splitter shroud 24 but in many instances, the shroud 24 along with a radially outer shroud 26 on the low pressure ratio blades 18 may be dispensed with. Needless to say, however, a stationary shroud 28 about the periphery of the compressor will be retained.

The shroud 28 is part of a housing 30 which includes a bell-like inlet 32 which is common to both sets of blades 16 and 18. If desired, conventional variable inlet guide vanes 34 rotatable about axes 36 (only one of which is shown) which intersect the axis 12 may be provided Preferably, the guide vanes 34 are arranged so that they may occlude the entrance ends 32 of the low pressure blades 18. In this way, when starting the turbine or the like, to minimize the loading on the compressor during startup, the vanes 34 may be closed. Thereafter, they may be regulated in a conventional fashion to achieve the usual desired results.

A housing wall 38 as well as an intermediate wall 40 support diffuser vanes 42 and also serve as a receiver for compressed air from the low pressure ratio blades 18. It will be observed that the components are aligned with the discharge ends 44 of the blades 18 for this purpose.

Air exits the receiver thus defined in a direction of an arrow 46 for purposes to be disclosed hereinafter.

Another receiver is defined by the wall 40 along with a wall 48 and diffuser vanes 50 aligned with the discharge ends 52 of the blades 16. The receiver thus defined discharges into a plenum 54 which is in surrounding relation to an annular combustor 56 provided with a plurality of fuel injectors 57 (only one of which is shown). The combustor 56 includes an outlet 58 to a nozzle 60 extending between a front turbine shroud 62 and a rear turbine shroud 64. Fuel is combusted in the combustor 56 and mixed with dilution air from the plenum 54 near the outlet 58 in a known fashion and then passed to the nozzle 60 whereat it is directed against a turbine wheel 66 mounted on the shaft 10 and thus coupled to the compressor hub 14. The turbine wheel 16 has turbine blades 68 against which the gases of combustion as well as dilution air are directed to drive the turbine wheel 66 and thus the compressor.

It will be appreciated that the foregoing arrangement maximizes combustion efficiency since low pressure air is passed to the first receiver; while high pressure air, supportive of highly efficient combustion, is directed to the combustor 56 to maximize efficiency.

Figure 2:
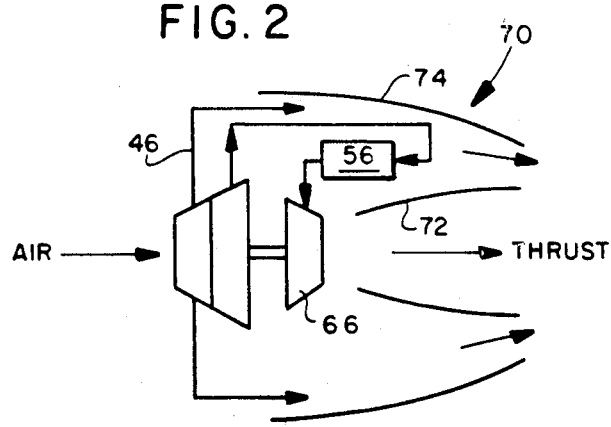
FIG. 2 is a schematic of one form of an engine embodying the invention.

The turbine thus described is susceptible to a variety of structural configurations depending upon the wants of the user. One such configuration is illustrated in FIG. 2 where the gas turbine is used as a thrust engine In this embodiment, there is provided a nozzle structure, generally designated 70, which includes an outlet 72 associated with the turbine wheel 66 so as to receive hot gases of combustion therefrom that produce thrust. The outlet 72 is surrounded by a nozzle duct 74 for bypass air and the receiver defined by the walls 38 and 40 discharges into the nozzle duct 74. Thus, the low pressure ratio air produces thrust along with the products of combustion in the embodiment of FIG. 2

Figure 3:
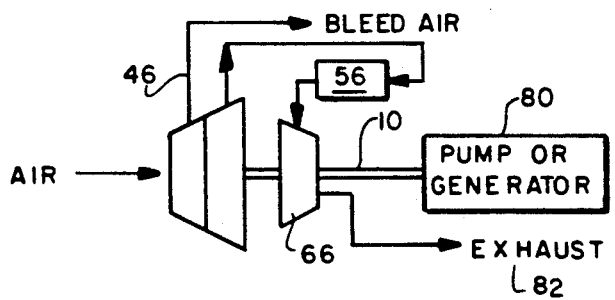
FIG. 3 is a schematic illustrating another embodiment of the invention.

FIG. 3 is similar but in this particular case, the gas turbine is utilized to drive a pump or a generator or the like, shown schematically at 80. Typically, such equipment will be connected to the shaft 10, normally on the compressor side rather than on the exhaust side as illustrated.

In any event, gases of combustion, after passing by the turbine wheel 66, are directed to exhaust as illustrated at 82. The air from the receiver defined by the walls 38 and 40 and illustrated by the arrow 46 may be utilized as bleed air in, for example, an aircraft air conditioning system or utilized for wing deicing or the like. In the case of the embodiment illustrated in FIG. 3, the same is basically configured as an auxiliary power unit.

Figure 4:
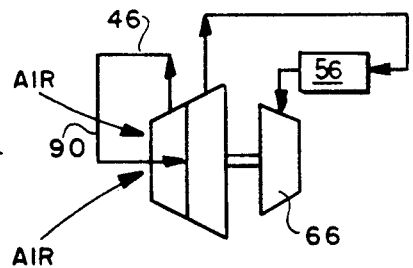
FIG. 4 is further schematic illustrating still another embodiment of the invention.

FIG. 4 shows still another form of the invention. In this form of the invention, the gas turbine can be used as a thrust engine or as a auxiliary power unit or otherwise as a source of drive power for mechanical equipment. The difference between this particular embodiment and those described previously is that the air indicated by the arrow 46 and received from the receiver defined by the walls 38 and 40 is, by appropriate ducting shown schematically at 90, rerouted centrally of an inlet directly to the inlet ends 20 of the blades 16, that is, the high pressure ratio blades. With this configuration, a multi-stage compressor is defined in the space occupied by a single rotor because of the relative radial dispositions of the two sets of blades on a single hub and relative to one another. Consequently, the efficiencies of multi-stage compression in a gas turbine can be obtained without sacrificing the advantage of axial compactness typically associated with use of radial compressors in such engines.

I claim:

1. A gas turbine comprising:
   a turbine wheel mounted for rotation about an axis;
   a nozzle about said turbine wheel for directing gas thereat;
   a combustor for burning fuel with compressed air providing the products of combustion to said nozzle;
   a compressed air plenum about said combustor;
   a radial flow centrifugal compressor rotatable about an axis and coupled to said turbine wheel to be driven thereby, said compressor having aerodynamically separate blade sets including a set of radially inner high pressure ratio blades and a set of radially outer low pressure ratio blades;
   a first receiver aligned with said high pressure ratio blades and connected to said plenum; and
   a second receiver aligned with said low pressure ratio blades and serving as an inlet to said high pressure ratio blades.

* * * * *